Jan. 7, 1969   J. T. NOE ETAL   3,420,222
APPARATUS FOR DETECTING AND INDICATING PHYSIOLOGIC MOVEMENT
Filed Dec. 13, 1965

INVENTORS
Joseph T. Noe
Donald M. Peppard
Bernard J. McCabe
BY
ATTORNEY

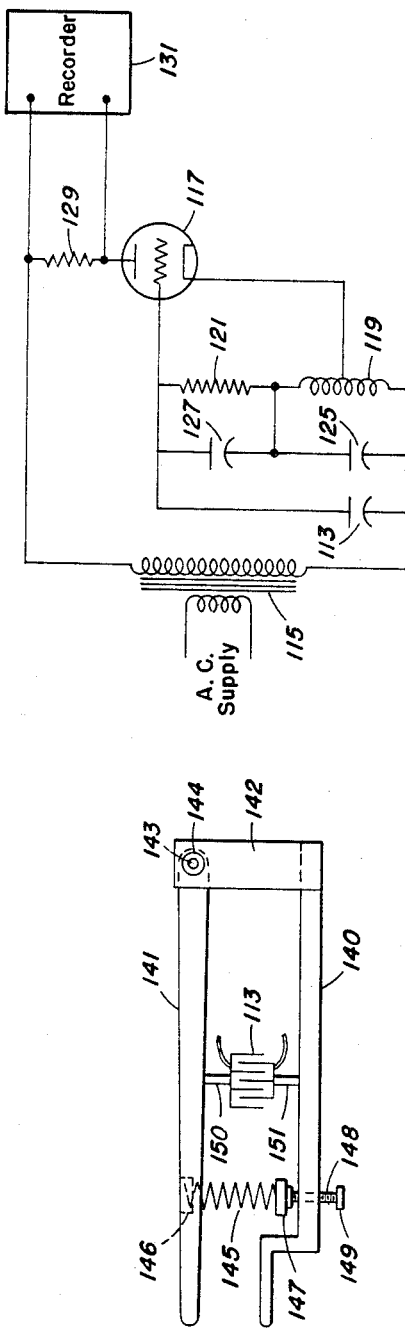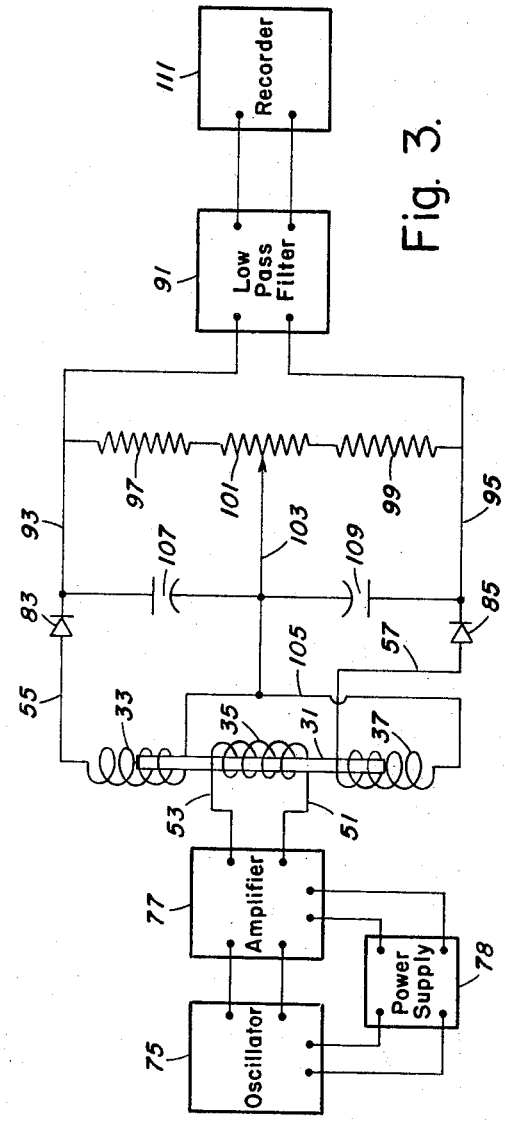

United States Patent Office 3,420,222
Patented Jan. 7, 1969

3,420,222
APPARATUS FOR DETECTING AND INDICATING PHYSIOLOGIC MOVEMENT
Joseph T. Noe, Chicago, Ill., and Donald M. Peppard and Bernard J. McCabe, Wyandotte, Mich., assignors to Wyandotte Chemicals Corporation, Wyandotte, Mich., a corporation of Michigan
Filed Dec. 13, 1965, Ser. No. 513,211
U.S. Cl. 128—2
Int. Cl. A61b 5/05
8 Claims

ABSTRACT OF THE DISCLOSURE

An apparatus for detecting and indicating physiologic movement comprising a pair of elongated members, means for pivotally connecting the elongated members to each other, spring means provided between the elongated members and spaced from the pivotal connecting means to resist movement of the elongated members toward each other, transducer means mechanically connected to the elongated members, a source of potential electrically connected to the transducer means, indicating means for indicating electric current changes, and means for electrically connecting the transducer means to the indicating means whereby physical movement of the elongated members relative to each other is converted by the transducer to proportionate electric current changes which are indicated by the indicating means.

---

The present invention relates to an apparatus for detecting, measuring and indicating physiologic movement of living beings and, more specifically, to a device for detecting and indicating movement of appendages of animals, particularly apes, monkeys and humans.

For purposes of diagnosis, it is desirable to be able to detect and record tremors of mercurialism and many other diseases in which tremors are a clinical sign. The measurement of these tremors presents serious and difficult problems due to the fact that any device for detecting and recording the tremors should differentiate between physiological tremors, for example, periodical movement following fatigue and pathological movements, for example, diseases of the nervous system such as paralysis agitans, chorea, and others. Such device should measure the progression or regression of diseases through tremor analysis and should aid in differential diagnosis of the various diseases which cause tremors.

It is known in the prior art to determine tremors by visual inspection, manually palpatiing the tremor, by handwriting and similar digital performance tests and by electromyography.

These methods possess certain inherent disadvantages in that the first two methods do not provide a permanent record and are not quantitative. The third method provides a record but, like the first two, is also not quantitative and lacks precision. The fourth method is a very complicated method which requires a cathode ray oscilloscope and may require surgical insertion of needles into the subject's tissue and thus is seldom used outside medical research centers. It is desirable to have a suitable device of this type which can be employed in the average physician's office for daily practice.

Accordingly, it is a purpose of this invention to provide a device for detecting and recording movements of certain appendages of primates, for example, fingers, which is simple, highly sensitive, readily portable, accurate, low cost and can be utilized in the average physician's office and/or clinic for daily practice.

This invention is best described with reference to the accompanying drawings wherein:

FIGURE 3 illustrates in schematic form a diagram of a means for electrically energizing the differential transformer of FIGURE 1 and connecting the output of the differential transformer to a recorder;

FIGURE 4 illustrates in schematic form a presently preferred apparatus embodying the principles of this invention employing a capacitor-type transducer; and FIGURE 5 illustrates in schematic form a diagram of means for applying a potential to the capacitor-type transducer of FIGURE 4 and means for connecting the output of said transducer to a recorder.

Figure 1:
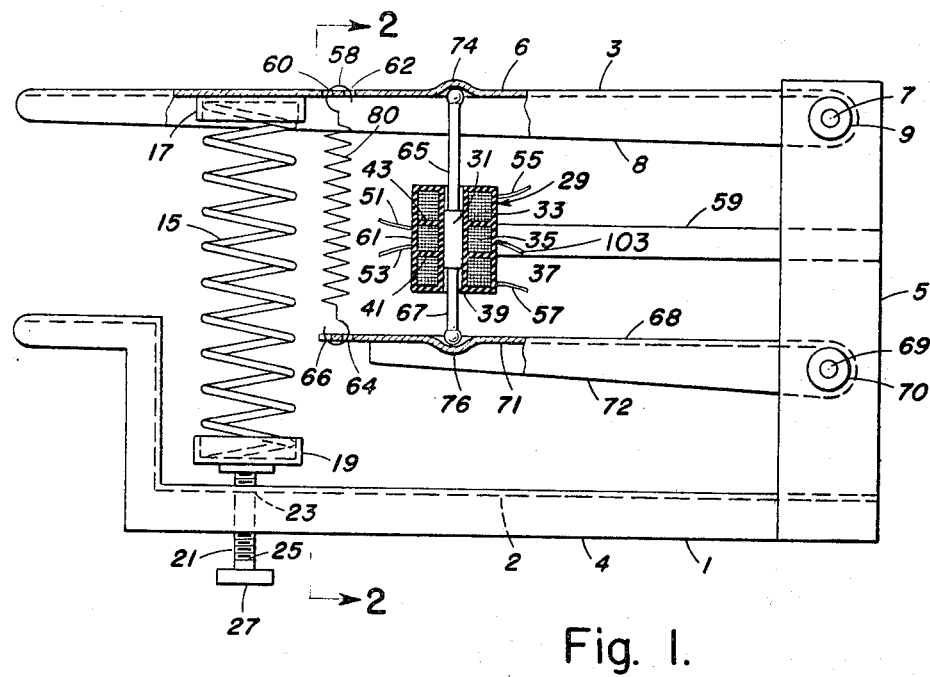
FIGURE 1 is an illustration, partly in section, of a presently preferred apparatus embodying the principles of this invention, employing a differential transformer-type transducer.

Referring now to the accompanying drawings in which the same reference numerals have been applied to various corresponding parts and circuit elements of the various views, it will be apparent that the power supply, oscillator, amplifier, low-pass filter circuit or network as well as the indicating device or recorder are schematically represented. Those skilled in the art of electronics and instrumentation are well acquainted with the specific nature of such apparatus.

Figure 2:
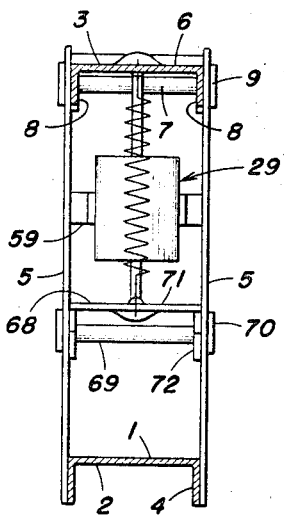
FIGURE 2 is a cross section of the apparatus of this invention, taken along the line 2—2 of FIGURE 1.

Referring now more particularly to FIGURES 1 and 2, the apparatus of this invention comprises a pair of elongated members 1 and 3 of suitable material, such as metal or plastic, with spacer means 5 connecting in spaced relationship one end of each of the elongated members. It is preferred in the interest of a high strength to weight ratio and convenience for assembling that the members 1 and 3 have a channel-shaped cross section, although this is not essential. As shown in FIGURE 2, member 1 comprises a web 2 and flanges 4 while member 3 comprises a web 6 and flanges 8. Spacer means 5 may comprise a pair of plates of suitable material, such as iron, steel, aluminum or possibly plastic, as shown in FIGURES 1 and 2.

One of the elongated members 3 is pivotally mounted on the spacer means 5 by means of a shaft 7 passing through one end of member 3 and bearings 9 mounted on spacer means 5 in a conventional manner. The other elongated member 1 is affixed to spacer means 5 by suitable means such as welding, bonding, etc.

While the apparatus shown in FIGURE 1 employs a spacer means 5 between members 1 and 3, either one or both of the members 1 and 3 could be either curved or have an angular configuration to permit pivotally connecting members 1 and 3 to each other without the necessity of a spacer means 5 to provide the desired spacing.

A suitable, conventional compression spring 15 is provided between elongated members 1 and 3 and spaced from the pivotal connecting means to resist movement of the ends of the longated members 1 and 3 toward each other.

In accordance with this invention and as one of the surprising features thereof, it has been discovered that when the ends of elongated members 1 and 3 are gripped between the thumb and forefinger of a subject, the muscle tremors rapidly increase in amplitude as the force exerted by the compressed spring 15 on the members 1 and 3 is increased. For example, a change in the spring constant of the device from 10 grams per millimeter of deflection to 200 grams per millimeter of deflection by adding a stiffer coil spring increased the finger against thumb movements of an individual by a factor of 8 times.

This has great value since, in many cases, the existence of tremors is not easy to detect. In such cases, this amplification effect makes it possible to detect tremors which otherwise might not be revealed.

The spring is mounted between members 1 and 3 through the use of a pair of suitable cup members 17 and 19 of a size to fit the ends of the spring as shown in the drawings. One of the cup members 17 is affixed to member 3 by suitable means such as welding, bonding, bolting, etc.

The force exerted by spring 15 may be made adjustable by mounting one of the cup members, such as cup member 19, on an adjusting screw 21 by suitable means, such as welding, bonding, etc., rather than directly on the member 1. The screw member 21 is mounted on elongated member 1 by threading through an opening 23 in member 1, the opening 23 having internal threads which engage with threads 25 on screw member 21. Screw member 21 is provided with a suitable head or knob 27, preferably knurled to permit turning the screw member 21 to increase or decrease the compression on spring 15.

A transducer is provided between and mechanically connected to both of the elongated members 1 and 3. A preferred transducer is known as a linear variable differential transformer or simply a differential transformer. This device is well known to those skilled in the electrical arts and is described in Bulletin R–3e, reprinted February 1964, published by International Resistance Company, 401 N. Broad St., Philadelphia, Pa. Such a transducer is employed in the embodiment of FIGURE 1 and is indicated generally by the numeral 29. This device consists of a magnetic iron core 31, positioned freely within three separate transformer windings 33, 35 and 37 mounted on a suitable spool member 39 preferably fabricated from an insulating material. Suitable spacers 41 and 43, preferably of insulating material, are provided on or integral with spool 39 to separate the three windings. The center winding 35 serves as a primary transformer winding which is supplied by leads 51 and 53 while the windings 33 and 37 act as secondary windings. The two windings 33 and 37 are connected internally to each other and to a lead 103. The output leads are indicated by the numerals 55 and 57.

The differential transformer 29 is mounted by affixing an elongated member 59 thereto. This may be accomplished by providing a casing 61 of any suitable material, preferably a magnetic shielding material around the differential transformer 29 as is conventional, and affixing the member 59 to the casing by suitable means such as welding, bonding, etc. Member 59 in turn is rigidly affixed to spacer means 5 by suitable means such as welding, bonding, bolting, etc. Member 59 is of sufficient width, as shown in FIGURE 2, to be directly affixed on each side to the respective plates of spacing means 5 and may have a tapered configuration, tapering toward the differential transformer 29, as shown in FIGURE 2. Member 59 and spacer means 5 thus provide an effective mechanical connection between differential transformer 29 and elongated member 1.

A pair of elongated members 65 and 67 are affixed to either end of the core 31 of differential transformer 29. Member 65 is pivotally connected to member 3 while member 67 is pivotally connected to an elongated member 68 which in turn is pivotally mounted on spacer means 5 by means of a shaft 69 and bearings 70 mounted on spacer means 5 in a conventional manner. In the interest of a high strength to weight ratio and convenience for assembling, member 68, like members 1 and 3, preferably has a channel-shaped cross section and thus comprises a web 71 and flanges 72.

The means for pivotally connecting member 65 to member 3 and member 67 to member 68 preferably comprises a pair of detents 74 and 76 provided in members 3 and 68, respectively. Members 65 and 67 and the core 31 of the differential transformer 29 are maintained within the detents 74 and 76 by the pressure on the respective ends of member 65 and 67 by members 3 and 68 as a result of the force imparted by a tension spring 80 connected at either end to members 3 and 68, respectively. This connection may be made by passing a hook 58 at one end of the spring 80 through a pair of openings 60 and 62 in member 3 and a hook 66 at the other end of spring 80 through an opening 64 in member 68. Thus, due to the force of spring 80, the ends of members 65 and 67 are maintained within the detents 74 and 76 and yet are free to move pivotally within said detents.

As previously pointed out, either one or both of the members 1 and 3 could be curved or have an angular configuration to permit pivotally connecting members 1 and 3 to each other without the necessity of a spacer means 5 to provide the necessary spacing. In the event such an arrangement was employed, member 59 could be connected directly to member 1 and member 68 could be pivotally mounted on member 1 in a manner which would be easily apparent to one skilled in the art.

It is apparent that in lieu of employing member 68 an elongated member such as member 67 connected to core 31 could be directly connected to elongated member 1, and a member such as 59 connected to the outside of the differential transformer 29 could be directly connected to member 3 with member 65 eliminated. With such an arrangment movement of member 1 relative to member 3 would cause the core 31 to move within the coils of the differential transformer 29 without the need for the thrid member 68. While this would provide a somewhat simpler apparatus, it would not be nearly as satisfactory for the purposes of this invention. The detection of muscle tremors requires detection of very subtle movements, accuracy of which would be greatly hindered and decreased by the presence of friction and, thus, it is desirable to maintain friction to an absolute minimum. While suitable results may be obtained with the alternative arrangement just described, far greater accuracy in detecting muscle tremors is obtained with the apparatus, as shown in FIGURE 1, whereby through the pivotal connection of members 65 and 67 to a pair of members 3 and 68 angular movements of the core and the accompanying friction within the spool 39 would be eliminated or substantialy reduced. Such angular movement and accompanying friction would be obtained in the alterantive arrangement where only one end of the core was connected to one of the arms or elongated members of the apparatus.

When the core 31 of the differential transformer 29 is centered in the coils, as shown in FIGURE 1, and an alternating source of potential is applied to the primary winding 35 through leads 51 and 53, no voltage appears between the output leads 55 and 57. However, when the core is displaced in either direction, the reactance of the secondary coils 33 and 37 is unbalanced and the alternating voltage between the output leads 55 and 57 is proportional to the displacement of the core.

With the arrangement of the apparatus as shown in FIGURE 1, it is necessary to provide a source of potential electrically connected to the differential transformer 29, a suitable indicating means for indicating electric current changes and electrical circuit means electrically connecting the differential transformer 29 to the indicating means whereby the physical movement of the members 1 and 3 relative to each other is converted to proportionate electric current changes which are then indicated by the indicating means. For purposes of measuring tremors to be used in medical diagnosis, a recorder is preferred to a simple indicator and any suitable recorder, such as a conventional electrocardiograph recorder, may be employed. In general, it is preferred to connect the output of the differential transformer 29 to the indicating means by a bridge-type rectifier circuit such as that shown in FIGURE 3.

With reference now more particularly to FIGURE 3, it will be seen that the differential transformer windings 33, 35 and 37 and the core 31 are represented schematically. The source of potential for the input or primary winding 35 comprises a conventional oscillator 75, the oscillations of which are amplified by a conventional linear power amplifier 77. Oscillator 75 is a conventional phase-shift oscillator capable of producing a frequency of 2000 c.p.s. The power for the oscillator 75 and amplifier 77 is provided from a conventional DC power supply 78. Suitable examples are shown and described in Electronics for Scientists by Malmstadt, Enke and Toren, W. A. Benjamin, Inc., New York, 1962. A suitable oscillator for this purpose is found on page 248 and a suitable amplifier is found on page 218 of this reference.

The output from amplifier 77 is fed through leads 51 and 53 to primary winding 35 of the differential transformer 29.

The output from secondary windings 33 and 37 is rectified by means of rectifiers 83 and 85. The current, if any, from leads 55 and 57 passing through rectifiers 83 and 85 is fed to a low-pass filter 91 through leads 93 and 95. Two fixed and equal resistances 97 and 99 and a potentiometer 101 between the two resistances are provided in series across lines 93 and 95. The center connection of potentiometer 101 is connected by means of lead 103 to a lead 105 which connects windings 33 and 37. Suitable capacitors 107 and 109 are provided between lead 103 and leads 93 and 95, respectively. In a specific application of this invention, the oscillator 75 puts out one volt at a frequency of 2000 c.p.s. The power amplifier has a gain of 10, thus providing an input of 10 volts to primary winding 35.

The dimensions of the members of the apparatus of FIGURES 1 and 2 are selected whereby the core 31 is in the null or neutral position when the members 1 and 3 are spaced apart the desired distance for gripping between the thumb and forefinger of the subject. Since the subjects vary in hand sizes, the potentiometer makes it possible to compensate for the possibility of the core being slightly off center in the initial position and, accordingly, the potentiometer 101 is adjusted so that in the normal position for a given subject voltages from leads 55 and 57 are equal and there is no potential difference between them.

As the finger and thumb grip the two members 1 and 3, the tremors between the two causes the core 31 to move back and forth due to the relative movement of the two members 1 and 3 toward and away from each other. As the core moves in one direction away from the null position, the current flowing through one of the resistors 97 or 99 and the associated portion of the potentiometer 101 will increase while the current through the other resistor and associated portion of the potentiometer decreases. The net output will be a DC voltage across the resistors 97 and 99 and potentiometer 101. Thus, the output of the circuit is a DC voltage proportional to the position of the core 31 and of opposite polarity on either side of the null position. It is desirable to have the excitation frequency, i.e., the frequency of the current from oscillator 75, at least 10 times the mechanical modulation frequency. In other words, the frequency from the oscillator and amplifier should be at least 10 times the frequency of vibration caused by the tremors applied to the members 1 and 3. The device of this invention offers the advantage of a flat frequency response up to one-tenth of the excitation frequency.

The output from leads 93 and 95 is preferably fed to a means for selection of the most suitable band of frequency such as low-pass filter 91, and the filtered output is fed to a suitable indicating means, preferably a recorder 111. As previously mentioned, recorder 111 may be a conventional recorder of the type employed with electrocardiographs. In one preferred embodiment of this invention wherein the recorder 111 is a conventional electrocardiograph recorder, the low-pass filter passes only frequencies below 50 cycles per second. Optionally, but not essentially, a D.C. blocking capacitor or high-pass filter which cuts off all frequencies below 2 cycles per second is also provided between the low-pass filter and the recorder or between the bridge circuit and the low-pass filter.

While a differential transformer is the preferred transducer means, other transducer means may be employed such as a variable capacitor. The use of a capacitor-type transducer is illustrated in FIGURE 4. The apparatus illustrated in FIGURE 4 is similar to that of FIGURE 1 with the exception of the transducer means and the means for mounting the transducer. The principal difference lies in the substitution of a variable capacitor 113 for the differential transformer 29 of FIGURE 1. The variable capacitor is shown schematically since construction of such capacitors is well known to those skilled in the art. As shown, capacitor 113 comprises two sets of plates whereby one set may be moved in and out of the spaces between the other set without contacting said plates which movement results in a variation in the capacitance. In view of the similarity of this apparatus to that of FIGURE 1, it will be described only briefly.

Referring now more particularly to FIGURE 4, it will be seen that the apparatus of this embodiment comprises a pair of elongated members 140 and 141 with spacer means 142, connecting in spaced relationship one end of each of the elongated members. As in the embodiment of FIGURE 1, it is preferred that members 140 and 141 have a channel-shaped cross section although this is not essential. Spacer means 142 may comprises a pair of plates of suitable material such as iron, steel, aluminum, or possibly plastic, or it could be a solid block of suitable material such as wood, plastic, metal, etc., with notches (not shown) provided in each end for the members 140 and 141 whereby the spacer means would have a modified H shape.

One of the elongated members 141 is pivotally mounted on the spacer means 142 by means of a shaft 143 passing through one end of member 141 and bearings 144 mounted on spacer means 142 in a conventional manner. The other elongated member 140 is affixed to spacer means 142 by suitable means such as welding, bonding, etc.

As in the embodiment of FIGURE 1, spacer means 142 could be eliminated by providing a curved or an angular configuration for members 140 and 141 whereby members 140 and 141 would be pivotally connected to each other.

A suitable conventional compression spring 145 is provided between elongated members 140 and 141 and spaced from the pivotal connecting means to resist movement of the ends of the elongated members 140 and 141 toward each other. The spring 145 is mounted between members 140 and 141 through the use of a pair of suitable cup members 146 and 147 of a size to fit the ends of the spring as shown in the drawing. One of the cup members 146 is affixed to member 141 by suitable means such as welding, bonding, bolting, etc. In order to achieve adjustability of the spring force, cup member 147 is mounted on an adjusting screw 148 which, in turn, is mounted on member 140 in a manner similar to that shown in FIGURE 1, adjusting screw 148 being provided with a knob 149. One set of plates of the variable capacitor 113 is affixed to member 141 by a suitable means such as a member 150 while the other set of plates of capacitor 113 is affixed to member 140 by suitable means such as a member 151.

It can be seen from FIGURE 4 that movement of one set of plates into or out of the spaces between the other set of plates of capacitor 113 is effected by movement of members 140 and 141 relative to each other. Thus, movement of members 140 and 141 relative to each other will vary the capacitance of capacitor 113.

In lieu of the type of variable capacitor illustrated in FIGURE 4, a capacitor may be employed which consists of a series of metal plates separated by resilient insulation to provide a sandwich-type combination whereby the electrical capacity changes with variations of pressure on the sandwich-type combination.

In FIGURE 5 of the drawings, a suitable circuit for use with a variable capacitor-type transducer is shown diagrammatically. In this circuit the capacitor-type transducer is shown at 113. Capacitor 125 and inductance 119 form the resonant circuit of a conventional Hartley oscillator. The circuit is completed by a vacuum tube 117, adjustable capacitor 127, grid leak resistance 121 and a transformer power supply 115 providing, for example, 250 volts A.C. stepped up from a conventional 110-volt A.C. source. Capacitor 127 serves as an adjusting means for adjusting the operating point. A similar circuit applied to actuating a relay is shown and described on pages 5–20 and 21 of Industrial Electronics Handbook by William D. Cockrell, 1958, McGraw-Hill Book Company, Inc. A recorder 131 is connected across a resistor 129 in the plate circuit of the amplifier tube 117.

It can be seen from examination of the circuit of FIGURE 5 that variations in the capacity of capacitor 113 due to mechanical movement of members 140 and 141 relative to one another result in current fluctuations across resistor 129 which are fed to the recorder 131. As in the case of the embodiment of FIGURE 1, the recorder may be a conventional electrocardiograph recorder.

While, in most cases, the best results in detecting, measuring and recording tremors are achieved by having the subject grip the open ends of the members 1 and 3 or 140 and 141 between the thumb and forefinger, the tremors may also be detected by placing the apparatus upright on a table and having the subject rest the forefinger 3 or 141 on the uppermost member 3 or 141. In such application the lever 1 or 140 could be eliminated and the spacer member affixed to a table top or platform. Accordingly, the expression "elongated member," as used in describing members 1 and 3, includes a base, table top, etc., as well as a lever.

While several embodiments of this invention have been shown and described, it will be apparent to one skilled in the art that the invention is by no means limited thereto but that many modifications may be made without departing from the scope thereof.

What is claimed is:

1. An apparatus for detecting and indicating physiologic movement comprising a pair of elongated members, means for pivotally connecting said elongated members to each other, spring means provided between said elongated members and spaced from said pivotal connecting means to resist movement of said elongated members toward each other, transducer means mechanically connected to said elongated members, which transducer means is a differential transformer comprising a magnetic iron core axially movable within three transformer windings mounted on a spool member, said spool member being connected to a first elongated member of said pair of elongated members and said core member being pivotally connected to the second of said pair of elongated members whereby movement of said elongated members relative to each other causes movement of said core member within said transformer windings, a source of potential electrically connected to said transducer means, indicating means for indicating electric current changes, and means for electrically connecting said transducer means to said indicating means whereby physical movement of said elongated members relative to each other is converted by said transducer to proportionate electric current changes which are indicated by said indicating means.

2. The apparatus of claim 1 wherein a spacer means is provided between said elongated members.

3. The apparatus of claim 1 wherein one end of said core member is pivotally connected to said second of said pair of elongated members and the other end of said core member is pivotally connected to a third elongated member, said third elongated member being pivotally connected to the first of said elongated members.

4. The apparatus of claim 1 wherein the means for electrically connecting said differential transformer to said indicating means includes a rectifier circuit.

5. The apparatus of claim 4 wherein said rectifier circuit is a bridge-type rectifier circuit.

6. The apparatus of claim 5 wherein said source of potential comprises an oscillator, an amplifier for amplifying the oscillations produced by said oscillator, a power supply means for supplying power to said oscillator and said amplifier, and means for connecting the output of said amplifier to said differential transformer.

7. The apparatus of claim 6 wherein filter means is provided between said bridge-type rectifier circuit and said indicating means.

8. An apparatus for detecting and indicating physiologic movement comprising a pair of elongated members, means for pivotally connecting said elongated members to each other, spring means provided between said elongated members and spaced from said pivotal connecting means to resist movement of said elongated members toward each other, transducer means mechanically connected to said elongated members, which transducer means being a variable capacitor-type transducer which comprises two sets of plates wherein the capacity is varied by moving the sets of plates toward or away from each other and wherein one side of said variable capacitor is mechanically connected to a first elongated member of said pair of elongated members and the other side of said variable capacitor is mechanically connected to the second of said pair of elongated members whereby movement of said elongated members relative to each other causes movement of said sets of plates toward or away from each other, a source of potential electrically connected to said transducer means, indicating means for indicating electric current changes, and means for electrically connecting said transducer means to said indicating means whereby physical movement of said elongated members relative to each other is converted by said transducer to proportionate electric current changes which are indicated by said indicating means.

References Cited

UNITED STATES PATENTS

| | | | |
|---|---|---|---|
| 2,361,788 | 10/1944 | Neff | 73—105 |
| 2,509,986 | 5/1950 | Neff | 33—172 |
| 3,000,101 | 9/1961 | Giordano et al. | 33—143 |
| Re. 12,908 | 1/1909 | Berry | 128—24 X |
| 2,478,595 | 8/1949 | Richter | 128—321 |
| 2,619,956 | 12/1952 | Torricelli | 128—2 |
| 3,363,260 | 1/1968 | Garbe | 346—72 |

RICHARD A. GAUDET, *Primary Examiner.*

K. L. HOWELL, *Assistant Examiner.*

U.S. Cl. X.R.

33—148; 73—71.4, 380